United States Patent
Van Der Kamp et al.

(10) Patent No.: US 6,626,781 B2
(45) Date of Patent: Sep. 30, 2003

(54) CONTINUOUSLY VARIABLE TRANSMISSION HAVING LUBRICATION NOZZLE OUTPUTS AT MAXIMUM POWER TRANSMITTING SECONDARY RADIAL BELT POSITION

(75) Inventors: Johannes Haaije Van Der Kamp, Tilburg (NL); Antonius Josephus Fonken, Berkel Enschot (NL); Rinus Johannes Maria Van Beers, Veldhoven (NL); Henri Van Driel, Breda (NL)

(73) Assignee: Van Doorne's Transmissie B.V., Tilburg (NL)

( * ) Notice: Subject to any disclaimer, the term of this patent is extended or adjusted under 35 U.S.C. 154(b) by 9 days.

(21) Appl. No.: 09/883,323

(22) Filed: Jun. 19, 2001

(65) Prior Publication Data
US 2002/0013189 A1 Jan. 31, 2002

(30) Foreign Application Priority Data

Jun. 20, 2000 (EP) .............................. 00202148

(51) Int. Cl.[7] ................................. F16H 57/05
(52) U.S. Cl. .......................... 474/91; 184/151
(58) Field of Search ..................... 474/91; 184/15.1, 184/15.2, 15.3, 11.1, 11.2, 11.3, 11.5

(56) References Cited

U.S. PATENT DOCUMENTS

| | | | |
|---|---|---|---|
| 1,771,835 A | * 7/1930 | Bartlett ..................... | 184/13.1 |
| 4,152,947 A | * 5/1979 | van Deursen et al. ........ | 474/11 |
| 4,898,050 A | * 2/1990 | Sakai .......................... | 477/38 |
| 5,033,989 A | 7/1991 | Shimaguchi | |
| 5,605,513 A | * 2/1997 | Van Der Hardt Aberson | 474/43 |
| 5,800,299 A | * 9/1998 | Lamers et al. ................ | 474/45 |
| 6,068,565 A | * 5/2000 | Riemer et al. ................ | 474/18 |

FOREIGN PATENT DOCUMENTS

| | | | | |
|---|---|---|---|---|
| EP | 0 574 085 | | 12/1993 | |
| JP | 2-150549 | | 6/1990 | |
| JP | 460251 | * | 2/1992 | ............ 474/91 |
| JP | 8254260 | * | 10/1996 | ........... F16H/57/04 |
| WO | WO 98/20269 | | 5/1998 | |

* cited by examiner

Primary Examiner—Thomas R. Hannon
Assistant Examiner—Vicky A. Johnson
(74) Attorney, Agent, or Firm—Young & Thompson

(57) ABSTRACT

A continuously variable transmission (1) includes a rotatable drive pulley (2) and a driven pulley (5), each of which having an axially displaceable sheave (4, 6) for transmission ratio control by varying the running radii of a torque transmission belt (8) running between the sheaves (3, 4; 6, 7); and a lubrication nozzle (9) having an output (O1, O2) for supplying a lubricating fluid to a midpoint (M1, M2) at the inner side of the belt (8), whereby at least one output (O1) of the lubrication nozzle (9) at the driven pulley (5) is directed to the midpoint (M1) of the transmission belt (8) while running in a transmission ratio (TOP) area, wherein a maximum power is transmitted by the transmission belt (8) The belt (8) is thus effectively cooled at a radial position within the driven or secondary pulleys (2), where due to a maximum power loss the generated heat is maximal.

8 Claims, 3 Drawing Sheets

CONTINUOUSLY VARIABLE TRANSMISSION HAVING LUBRICATION NOZZLE OUTPUTS AT MAXIMUM POWER TRANSMITTING SECONDARY RADIAL BELT POSITION

BACKGROUND OF THE INVENTION

The present invention relates to a continuously variable transmission comprising a rotatable drive and driven pulley, each of which having an axially displaceable sheave for transmission ratio control by varying the running radii of a power transmission belt running between the sheaves; and a lubrication nozzle having an output for supplying a lubricating fluid to a midpoint at the inner side of the belt.

The present invention also relates to a lubrication device suitable for application in a continuously variable transmission (hereinafter also referred to as CVT) and to a vehicle provided with the continuously variable transmission.

DESCRIPTION OF THE RELATED ART

It is generally known in the art to increase the performance of a CVT by appropriate cooling and lubrication of the transmission, in particular of the belt. For this purpose it is known to provide an oil supplying tube in the transmission for exhausting pressurised medium in the direction of the belt's inner side. An improvement is known from EP-A-0 688 980, disclosing a hydraulic supply tube having several discharge openings, shown directed to locations of entry of the belt at each pulley.

Such a continuously variable transmission acknowledged in the preamble of claim 1 is generally known in the art, in particular from WO 98/20269 (EP-A-0866929). The known transmission comprises a rotatable drive or primary pulley and a rotatable driven or secondary pulley, both being rotatable about parallel axes. Each of the pulleys have an axially displaceable sheave or pulley half, and a fixed sheave. By axial displacement of the sheaves concerned running radii of a torque transmission belt running between the sheaves are continuously variable for varying the transmission ratio of the transmission. The transmission further comprises lubrication nozzles having outputs for supplying lubricating oil to midpoints of the belt. In particular these outputs open at two parallel and axially offset hypothetical planes C and C' respectively. The first output extends perpendicularly to the axes through the first midpoint, which is situated (see FIG. 4) at a maximum of a first axial distance; that is at a maximum speed ratio, at LOW transmission ratio, corresponding with a minimum radial distance between the sheaves of the drive or primary pulley. The second output extends through a second midpoint, which is situated at a maximum of a second axial distance, that is at a minimum speed ratio, at a high transmission ratio, generally called OD (overdrive) corresponding with a minimum radial distance between the sheaves of the driven or secondary pulley. Both midpoints are derived from conditions wherein the transmission belt is subjected to a tension originating from a bending at its smallest radii of curvature at the inner sides of the drive and driven pulleys respectively. It is according to the prior art apparently assumed that under those conditions speed differences and slide movements between transverse elements and bands or rings holding these elements together to form the transmission belt, tend to be maximal. Accordingly it is proposed to direct the outputs of the lubrication nozzle at the geometrically derived midpoints of the transmission belt which midpoints are derived from two extreme outer and opposing transmission ratios.

SUMMARY OF THE INVENTION

It is the object of the present invention to provide an optimised manner in which the belt may be applied in a transmission and promote optimal cooling features of the belt and transmission.

Thereto the continuously variable transmission according to the invention is characterised in that at least one output of the lubrication nozzle at the driven pulley is directed to the midpoint of the transmission belt while running in a transmission ratio TOP area A, wherein a maximum power is transmitted by the transmission belt.

Accordingly the lubrication device for application in the continuously variable transmission and a vehicle provided with such a transmission have corresponding characterising features.

According to the invention the performance of the transmission has now been improved further, because use is made of the notion that if the transmitted power through the transmission and belt is maximal the power loss and associated generated heat of the variable transmission process is maximal too—which is the case at the so called TOP transmission ratio—and cooling is theoretically and practically to be essential. According to an insight of the present invention, in said TOP ratio relatively more power gets lost, so that the absolute amount of power loss, meaning heat dissipation, through a certain percentage of slip occurs in that ratio. In particular at the secondary or driven pulley, where curvature of the belt elements between the secondary sheaves is strongest and the need for lubrication is correspondingly high this lubrication is now advantageously provided for. The relative larger amount of lost power is absorbed effectively if the output of the lubrication nozzle is directed such that account is taken of the actual secondary radial position of the belt, wherein this larger power is generated. Advantageously the so called splash temperature of lubricating fluid splashing from the rotating transmission belt is measured to be lowered. In an example the power loss increase between an OD (overdrive) transmission ratio and the TOP transmission ratio amounts a substantial 45%, here corresponding with 1.1 KW.

An effective cooling under such a maximum heat producing condition reduces the chances of overheating essential parts of the transmission constituents and of overheating the lubricating fluid, such as oil applied therein. The latter reduces the chances of oil disintegrating as a consequence of a possible exceeding of an allowable peak temperature of the oil and increases its life time as well as the capability of maintaining its lubricating properties during a longer period of time. If such a peak temperature is now locally exceeded at all the duration of such a local exceeding is advantageously reduced. Because of the reduced overheating the life time of the transmission and in particular the transmission belt is increased, and the maintaining of consistent and constant wear and tear properties will be prolonged, which improves durability and reliability during a longer operational period of time of the CVT.

In addition it has been observed by the inventor that because of the lubrication proposed the most inner band of a band pack which holds the transmission belt and its transverse elements together shows a decreased decay of ring surface roughness, which prolongs the lifetime of the transmission and in particular its transmission belt.

An embodiment of the continuously variable transmission according to the invention is characterised in that one other output of the lubrication nozzle at the drive pulley is directed to the midpoint of the transmission belt, while running in a transmission ratio LOW area B.

Power loss at the transmission ratio LOW end of the drive pulley is substantial too and may advantageously be combined with reduction at the transmission ratio TOP end of the driven pulley in order to arrive at an even further improved two sided cooling of the continuously variable transmission according to the invention.

A further embodiment of continuously variable transmission according to the invention is characterised in that the lubrication fluid emanating from the nozzle has a flow direction which is in agreement with the rotation direction of the drive and/or driven pulleys.

Advantageously no extra heat is generated because oil particle collisions at excessive velocity differences are avoided.

A still further embodiment of continuously variable transmission according to the invention is characterised in that the output of the lubrication nozzle is single or double respectively. In particular a double lubrication nozzle improves lubrication and cooling.

In another embodiment of the invented transmission, controllable amounts of the respective lubricating fluid yields through outputs O1 and O2 per unit time lie in the range between 1:2 and 2:1. This can be transmission ratio dependent.

In still another embodiment the lubricating fluid is supplied in one of more laminar flows, which reduces the lubrication fluid pump capacity, and the presence of air bubbles in the fluid, such as oil.

Another further embodiment of the continuously variable transmission according to the invention saving valuable space in between the pulleys, is characterised in that the lubrication nozzle comprises a single pipe entering the region between the drive and driven pulley. Preferably the single pipe is joined to a branch pipe forming the double output of the lubrication pipe, which saves valuable space between the pulley sheaves of the transmission according to the invention.

BRIEF DESCRIPTION OF THE DRAWINGS

At present the continuously variable transmission, the lubrication device and the vehicle provided with such a transmission, all according to the invention will be elucidated further together with their additional advantages, while reference is being made to the appended drawing, wherein similar components are being referred to by means of the same reference numerals. In the drawing.

DESCRIPTION OF THE PREFERRED EMBODIMENTS

Figure 1:
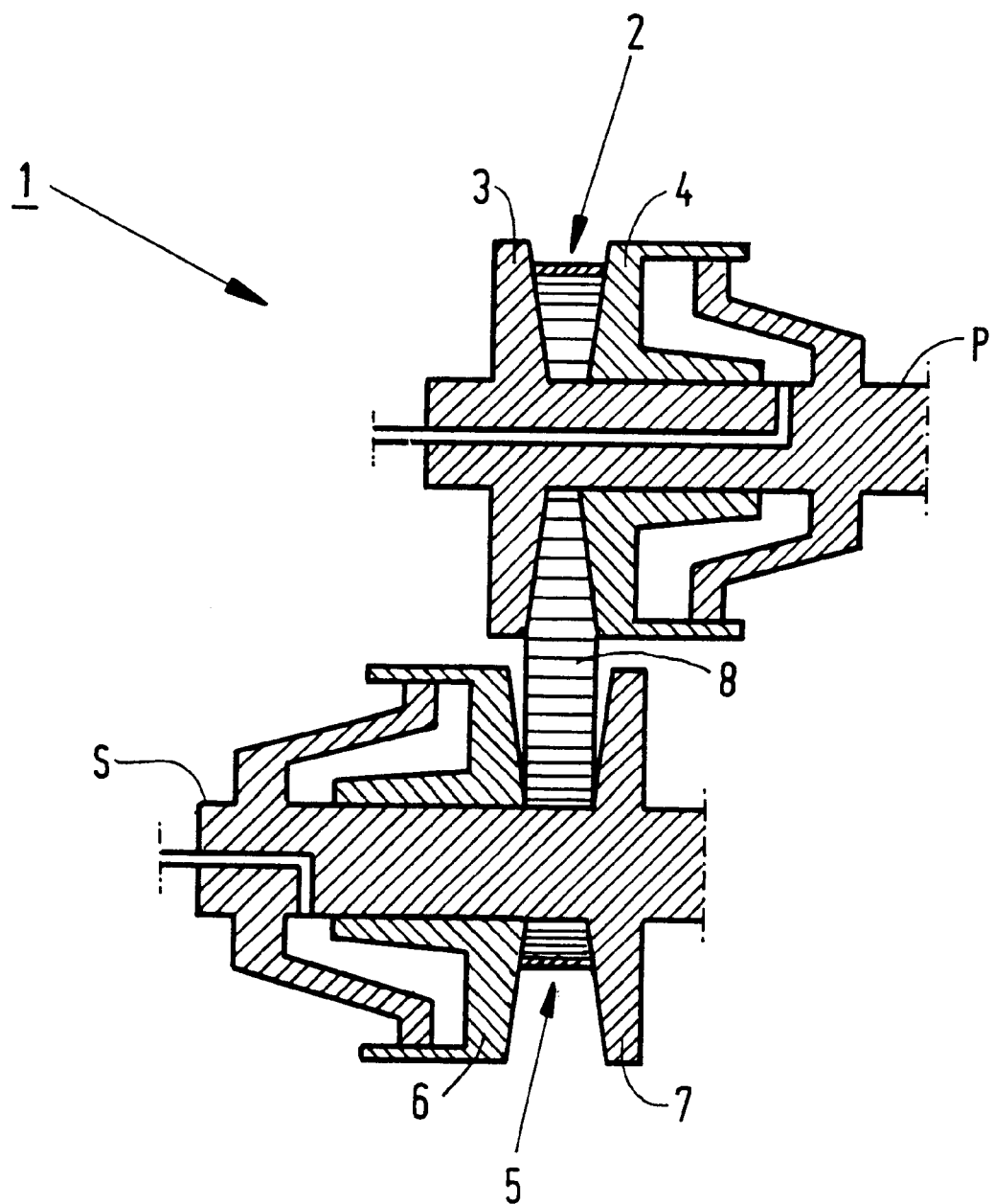
FIG. 1 shows a schematic view of a continuously variable transmission according to the prior art.

FIG. 1 shows a continuously variable transmission 1, The transmission 1 comprises a rotatable drive or primary pulley 2 on a primary axes P, the drive pulley 2 having drive sheaves 3 and 4, and comprises a rotatable driven or secondary pulley 5 on a secondary axes S, the driven pulley 5 having driven sheaves 6 and 7. Sheaves 4 and 6 are axially displaceable in opposite axial directions in order to allow transmission ratio control by variation of the running radii of a torque transmission belt 8 running between the sheaves 3, 4 and 6, 7. An engine (not shown) may through for example a torque converter be mechanically coupled to the drive pulley 2 and the driven pulley 5 may through for example a planetary gearset be coupled to wheels of a vehicle. The control of the transmission ratio of the continuously variable transmission 1 takes place in a manner generally known to persons skilled in the art.

Figure 2:
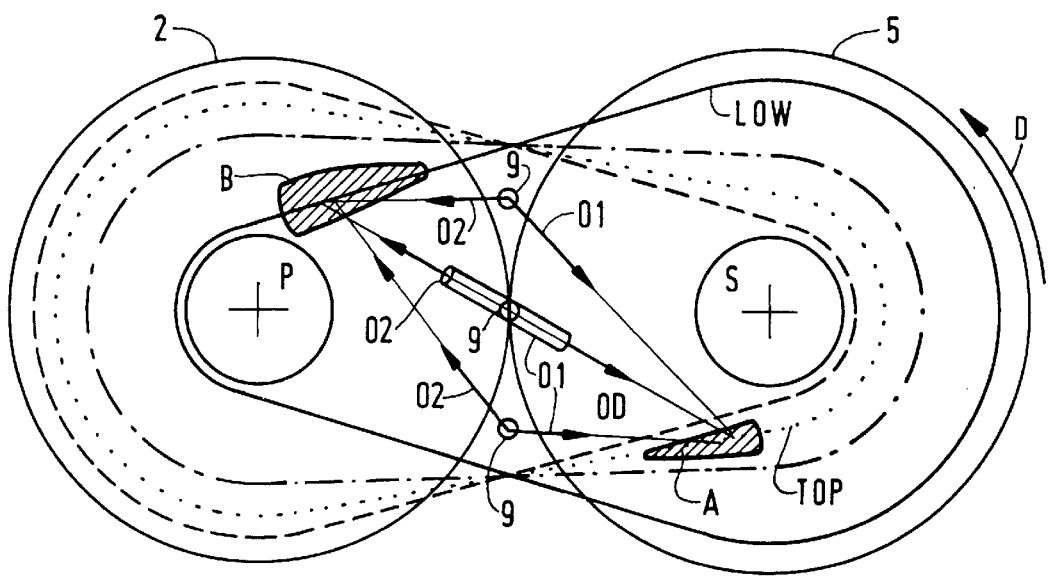
FIG. 2 shows a schematic view of various possible combinations of embodiments of the lubrication device for application in the transmission according to the present invention.
Figure 3:
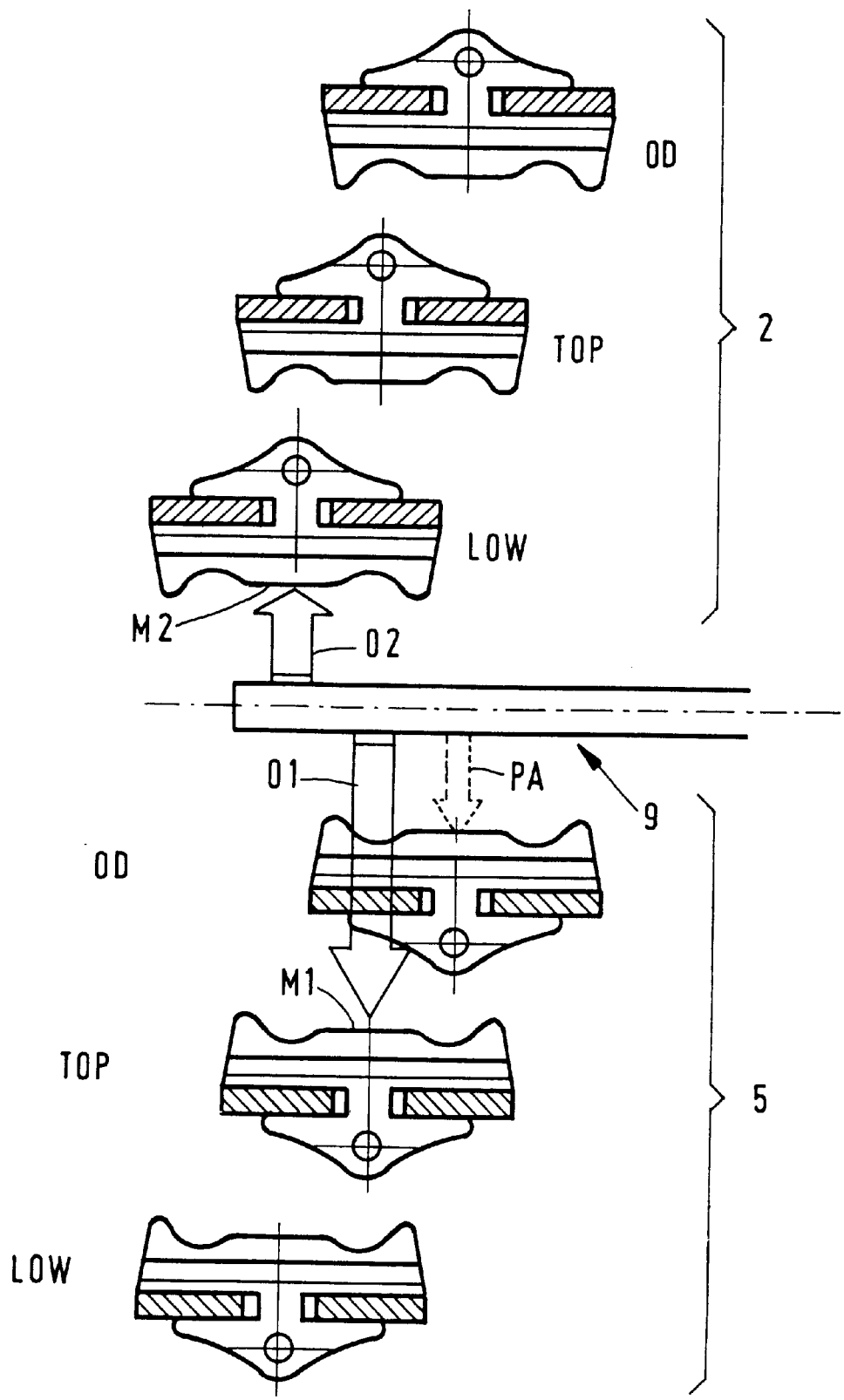
FIG. 3 shows lubrication directions and schematic cross sectional views of axial positions of transverse elements of the transmission belt in respective radial positions associated with transmission ratios also shown in FIG. 2.

FIG. 2 shows in side view schematically that the transmission 1 comprises a lubrication nozzle 9. The nozzle 9 supplies lubricating fluid, generally oil or any other suitable cooling and lubricating substance to a midpoint M1 of the transmission belt or V-belt 8. The midpoint M1 is chosen such that its radial position between the sheaves 6, 7 of the driven pulley 5 reflects a position of the transmission belt 8, wherein the belt while running in a so called transmission ratio TOP transmits a maximum power and suffers from a correspondingly maximum power loss. In FIG. 2 a hatched area A is indicated wherein the belt 8, while in transmission ratio TOP enters and contacts the secondary sheaves 6 and 7. In this transmission ratio TOP the radial position of the belt 8 is as shown in FIG. 2 and the corresponding axial position of the belt 8 is shown in FIG. 3. The TOP ratio will generally be at least 20% higher than the transmission ratio at an overdrive (OD) ratio. A typical example from a practice validation test is given in table I below, wherein Nprim is the rotating speed of the primary axes P, Tp is the torque on the primary axes P, and MED. is the medium transmission ratio.

TABLE I

| Transmission Ratio | Nprim [rpm] | Tp [Nm] | Powerloss [KW] |
|---|---|---|---|
| 0.6 TOP | 6000 | 115 | 3.5 |
| 1 MED. | 6000 | 115 | 2.1 |
| 0.445 OD | 4000 | 110 | 2.4 |
| 2.470 LOW | 4000 | 110 | 3.4 |

It can be seen from the data in table I that the powerless is relatively very high in TOP ratio and that thus cooling and lubrication of the belt 8 are most critical there. Therefore at least one output O1 of the nozzle 9 is aimed at the midpoint M1 whose radial position at the driven pulley 5 corresponds to the TOP ratio.

The output of the lubrication nozzle 9 may be single but will generally be double in order to take also the maximum power loss at the LOW ratio into account, which is also relatively high as can be taken from table T. Thereto the second output O2 of the lubrication nozzle 9 is directed to the further midpoint M2 in a hatched area B, which is situated there where the running radius of the belt 8 between the sheaves 3, 4 of the drive pulley 2 is such that the belt 8 is subjected to a high power loss. Generally in order to save valuable space in the engine compartment of a vehicle provided with a transmission 1 the opposing pulleys 2 and 5 will nearly contact one another. In that case an off axial centre-line position of the nozzle 9 as shown too in FIG. 2 could be preferred. The lubricating fluid jet will enter the transverse elements 10 building up the belt 8 from below in the midplane of the elements 10, as shown herein. Several possible embodiments of the lubrication device 9 for application in the transmission 1 are combined in FIG. 2. The lubricating fluid jet or jets emanating from various outputs O1, O2 of the nozzle 9 have a flow direction which may be in agreement with the rotation direction D of the drive pulley 2 and/or the driven pulley 5.

As shown in the embodiment of FIG. 3 the nozzle 9 is branched to have two axially offset outputs O1 and O2 directed to midpoint M1 and M2. The three upper transverse elements 10 therein refer to the radial belt position in transmission ratios OD, TOP and LOW respectively, while the elements are in the drive pulley 2, and the three lower elements 10 refer to the radial belt position while the elements 10 are in the same respective ratios in the driven pulley 5. Having the double output O1, O2 the respective oil yields per unit time lie in the range between 1:2 and 2:1, while preferably these yields are 50% each, because of the approximately equal amounts of power to be absorbed at the driven and drive pulleys 5 and 2 respectively, as indicated in table I. Preferably the lubricating fluid is supplied in one of more laminar flows.

Figure 4:
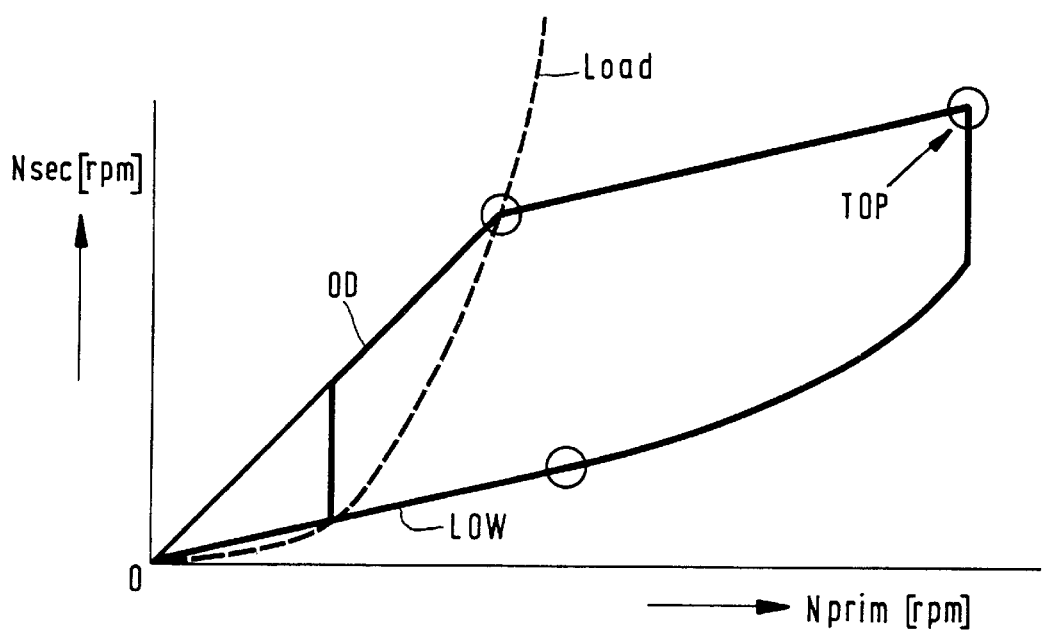
FIG. 4 shows a variogram of the driven/secondary axes speed corresponding with the vehicle speed versus the drive/primary axes speed corresponding with the engine speed.

FIG. 4 shows a variogram of the driven/secondary axes S speed, which corresponds with the vehicle speed versus the drive/primary axes P speed, which corresponds with the engine speed. The dotted line LOAD forms the road load line which intersects and limits the OD line. Transmission ratios LOW and OD are indicated therein defining a parallelogram-like transmission ratio control area, whereof O indicates the origin and its opposing corner point reflects TOP where the notion elucidated here is all about. Clearly in the variogram these respective different transmission ratios LOW, OD and TOP lie relatively far apart from one another. In addition the second prior art lubrication output, referred to as PA in FIG. 3, mentioned in the preamble of this description and known from EP-A-0 866 929 is shown in dotted form therein at transmission ratio OD.

What is claimed is:

1. A continuously variable transmission (1) comprising a rotatable drive (2) and driven pulley (5), each of which having an axially displaceable sheave (4, 6) for transmission ratio control by varying the running radii of a power transmission belt (8) running between the sheaves (3, 4; 6, 7); and a lubrication nozzle (9) having an output (O1, O2) for supplying a jet of lubricating fluid to a midpoint (M1, M2) at the inner side of the belt (8), characterised in that
   at least one output (O1) of the lubrication nozzle (9) at the driven pulley (5) is directed to the midpoint (M1) of the transmission belt (8) while running in a transmission ratio TOP area (A),
   the lubrication nozzle (9) has two outputs (O1,O2) and the lubricating fluid yields through the outputs (O1, O2) per unit time are approximately equal,
   wherein the TOP area is a position of the transmission belt where a maximum power is transmitted by the transmission belt (8).

2. The continuously variable transmission (1) according to claim 1, characterised in that one other output (O2) of the lubrication nozzle (9) at the drive pulley (2) is directed to the midpoint (M2) of the transmission belt (8), while running in a transmission ratio (LOW) area (B).

3. The continuously variable transmission (1) according to claim 1, characterised in that the lubricating fluid emanating from the nozzle (9) has a flow direction which is in agreement with the rotation direction (D) of the drive and/or driven pulleys (2,5).

4. The continuously variable transmission (1) according to claim 1, characterised in that the lubricating fluid is supplied at each output (O1,O2) in one of more laminar flows.

5. The continuously variable transmission (1) according to claim 1, characterised in that the lubrication nozzle (9) comprises a single pipe entering the region between the drive and driven pulleys (2,5).

6. The continuously variable transmission (1) according to claim 5, characterised in that the single pipe (9) is joined to a branch pipe forming the double output (O1, O2) of the lubrication nozzle (9).

7. A lubrication device (9) suitable for application in a continuously variable transmission (1), comprising a rotatable drive and driven pulley (2, 5), each of which having an axially displaceable sheave (4, 6) for varying the running radii of a torque transmission belt (8) running between the sheaves (3, 4; 6, 7); and a lubrication nozzle (9) having an output (O1, O2) for supplying a jet of lubricating fluid to a midpoint (M1, M2) of the belt (8), characterised in that the output (O1) of the lubrication nozzle (9) is directed to the midpoint (M1), which is situated where the running radius of the belt (8) between the sheaves (6, 7) of the driven pulley (5) is such that the belt (8) is subjected to a maximum power loss,
   the lubrication nozzle (9) has two outputs (O1,O2) and the lubricating fluid yields through the outputs (O1,O2) per unit time are approximately equal.

8. A vehicle provided with continuously variable transmission (1) comprising a rotatable drive and driven pulley (2, 5), each of which having an axially displaceable sheave (4, 6) for varying the running radii of a torque transmission belt (8) running between the sheaves (3, 4; 6, 7); and a lubrication nozzle (9) having an output (O1, O2) for supplying a jet of lubricating fluid to a midpoint (M1, M2) of the belt (8), characterised in that the output (O1) of the lubrication nozzle (9) is directed to the midpoint (M1), which is situated where the running radius of the belt (8) between the sheaves (6, 7) of, the driven pulley (5) is such that the belt (8) is subjected to a maximum power loss,
   the lubrication nozzle (9) has two outputs (O1,O2) and the lubricating fluid yields through the outputs (O1,O2) per unit time are approximately equal.

* * * * *